May 24, 1927.

E. J. ELSAS 1,630,174

COMBINED LEVEL AND PLUMB

Filed June 8, 1925

E. J. Elsas, Inventor

By C. A. Snow & Co.
Attorneys

Patented May 24, 1927.

1,630,174

UNITED STATES PATENT OFFICE.

EDWARD J. ELSAS, OF KANSAS CITY, MISSOURI.

COMBINED LEVEL AND PLUMB.

Application filed June 8, 1925. Serial No. 35,683.

This invention relates to leveling instruments of the class which embodies liquid containers to indicate the level, plumb and other positions.

The object of the invention is to provide a simple device of this charater which is very light to handle, pack and carry and which may indicate the relations to the horizontal or vertical in any ordinary position in which it may be laid or set.

With the foregoing and other objects in view which will appear as the description proceeds, the invention resides in the combination and arrangement of parts and in the details of construction, it being understood that changes in the precise embodiment of the invention herein disclosed may be made within the scope of what is claimed without departing from the spirit of the invention.

In the accompanying drawings:—

Figure 1:
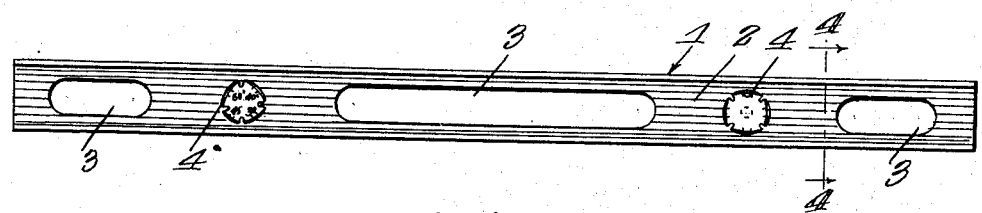
Figure 1 represents a side elevation of the instrument embodying this invention.
Figure 2:
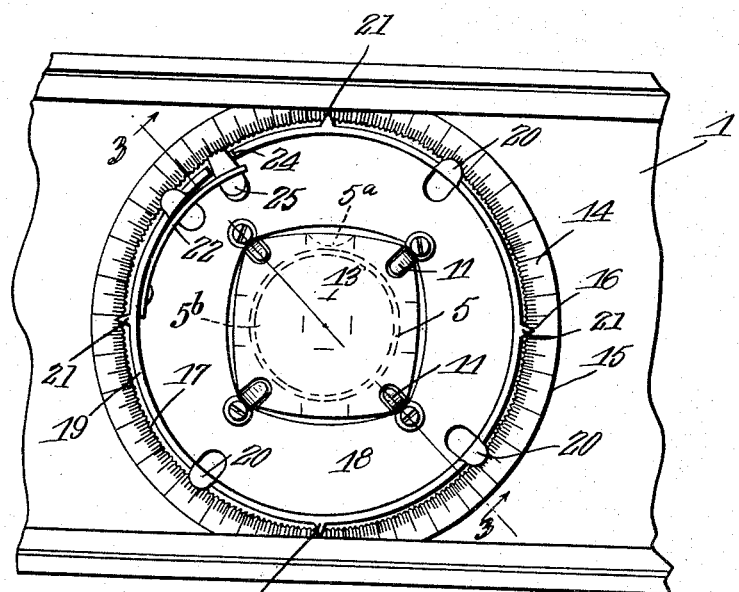
Fig. 2 is an enlarged detail side elevation.
Figure 3:
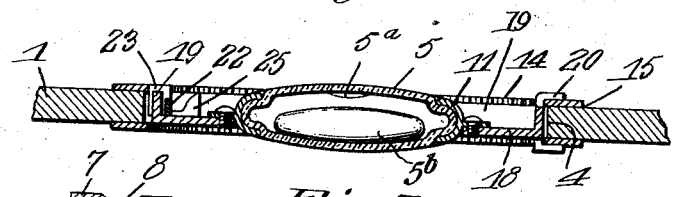
Fig. 3 is a section taken on the line 3—3 of Fig. 2.
Figure 4:
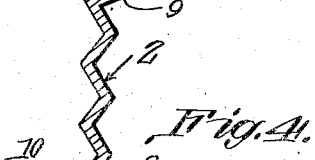
Fig. 4 is a transverse section taken on the line 4—4 of Fig. 1.

The level constituting this invention has a body 1 preferably stamped out of sheet metal and substantially I-shaped in cross section similar to an I beam.

The central portion or web 2 of the level is longitudinally corrugated or crimped and is preferably provided with a plurality of openings 3 to lighten the structure and provide means for hanging it up.

Arranged between the openings 3 are specially formed openings 4 adapted to hold vessels 5 for containing the leveling liquid. 6 and 7 represent faces of the instrument and the face 7 has a longitudinally extending corrugation or depression 8 to stiffen and reinforce it, the face 6 being made smooth throughout. Two angular portions 9 unite the web 2 with the faces 6 and 7 at one of their longitudinal edges. Wedge-shaped blocks 10 are fastened and fill the space between the face 6 and the angular portion 9 to stiffen the level and render it more symmetric and more massive in appearance.

The vessels 5 are here shown constructed substantially rectangular in form of translucent material and are filled with alcohol or other suitable liquid except for the vacuum bubbles indicated at 5ª.

Each container 5 is equipped with recesses 11 preferably located in the corners thereof and adapted to receive metal lips struck out of the body of the level some of which are located on one side of the level and some on the other and are designed to hold the container 5 in operative position. A plurality of marks C are formed on the surfaces of the container at the edges of the bubbles at the level, plumb and other positions of the instrument.

The container 5 may be made to have six gradually convex faces, each having marks thereon normally indicating plumb, level or degrees of incline when the bubble shows between any pair of such marks. By the use of this means the level may be placed any edge, face or end up and instantly show at about the same place in the same container the level, plumb or other position or the relation thereto. Located within the container 5 is a body 5ᵇ which may be either hollow or solid and is impermeable to the container fluid and of a thickness or weight sufficient to cause it to gradually sink in the fluid and thus leave the vacuum bubble 5ª with ample room to seat itself at the highest point in the container when the instrument is used.

A channel section ring 14 is set tightly in a circular aperture 15 formed in the web of the level and this ring is equipped with quadrant degrees 16 marked on the outer faces of the channel and corresponding notches 17 extend transversely across the inner face of the channel ring.

A disk-shaped member 18 is mounted within the ring 14 and is equipped with a peripheral flange 19 on the outer edge of which are formed a plurality of outwardly and radially extending lugs 20. This disk 18 also is equipped with a plurality of small outwardly projecting indicator points 21 formed on the edges of the periphery of the disk.

The disk 18 has centrally mounted therein one of the containers 5 which is secured in a manner similar to that hereinbefore described.

The indicator points 21 are preferably set at the quadrant degrees of the circle and the container 5 is set with its outer four faces square with the indicators so that normally the bubbles in any of these outer faces will be in line with an indicator.

A narrow leaf spring 22 is fitted concentrically within and on the inner face of the periphery or rim of the disk 18 and is secured at one end to said disk by rivets or otherwise. A block 23 is carried by the free ends of the spring 22 which extends through an opening 24 in the flange 19 of the disk. This block 23 has teeth or serrations on its outer face which cooperate with the notches or teeth 17 of the ring 14. This meshing of the block with the ring 14 operates to hold the disk 18 with its container 5 and indicator points at any desired marked degree of angle.

It is understood of course that in order to easily adjust the disk 18 the block 23 may be disengaged from the ring 14, a finger grip 25 being provided for this purpose.

The container 5 being six faced and convex in form is sufficiently strong that no guards are found necessary over it thus affording clear vision to its position and making the level more simple and less costly.

By constructing the level as herein shown and described, a less amount of metal is required while a maximum amount of strength is obtained and the construction of which adapts it to be very light to facilitate handling.

What is claimed is:—

In a device of the character described, a body portion having an opening extending therethrough, a ring member having graduations formed thereon positioned within the opening, a disk-like member having a central opening adjustably secured to said ring member, a hollow body portion removably supported within the opening of the disk-like member, said hollow body portion containing a fluid, a bubble, and a movable solid body within the hollow body portion, and means for adjusting the disk-like body portion with respect to the ring member.

In testimony that I claim the foregoing as my own, I have hereto affixed my signature.

EDWARD J. ELSAS.